G. A. HOLZAPFEL.
MEAT CUTTING MACHINE.
APPLICATION FILED JAN. 27, 1916.

1,205,542.

Patented Nov. 21, 1916.
2 SHEETS—SHEET 1.

Inventor
Gustav Adolf Holzapfel
By
his Attorney

G. A. HOLZAPFEL.
MEAT CUTTING MACHINE.
APPLICATION FILED JAN. 27, 1916.

1,205,542.

Patented Nov. 21, 1916.
2 SHEETS—SHEET 2.

Inventor
Gustav Adolf Holzapfel
By
his Attorney

UNITED STATES PATENT OFFICE.

GUSTAV ADOLF HOLZAPFEL, OF LEIPZIG, GERMANY.

MEAT-CUTTING MACHINE.

1,205,542.  Specification of Letters Patent.  Patented Nov. 21, 1916.

Application filed January 27, 1916. Serial No. 74,617.

*To all whom it may concern:*

Be it known that I, GUSTAV ADOLF HOLZAPFEL, a citizen of Germany, and a resident of the town of Leipzig, in Germany, have invented new and useful Improvements in Meat-Cutting Machines, of which the following is a specification.

This invention relates to machines for cutting meat and the like material into slices and strips, and in particular to a machine in which the material to be cut up is first fed to a revolving knife disk and thereafter to a cutting device comprising a radially slitted roller and a plurality of counter disks projecting into the slits of the roller and revolving in opposite direction to the latter.

This invention relates to a cutting device for a meat cutting machine in which a rotary cutting roller having a series of spaced cutting disks operates in conjunction with a rotary feed roller having a series of annular slots engaged by the disks of the cutting roller.

The invention consists in a device of this character in which the rotary feed roller has peripheral projections adapted to engage the material and impel it toward the cutting roller and a suspended guide plate engaged at its lower end by said feed roller and vibrated by the projections thereon.

An embodiment of my invention I have illustrated in the accompanying drawings, by way of example.

Figure 1:
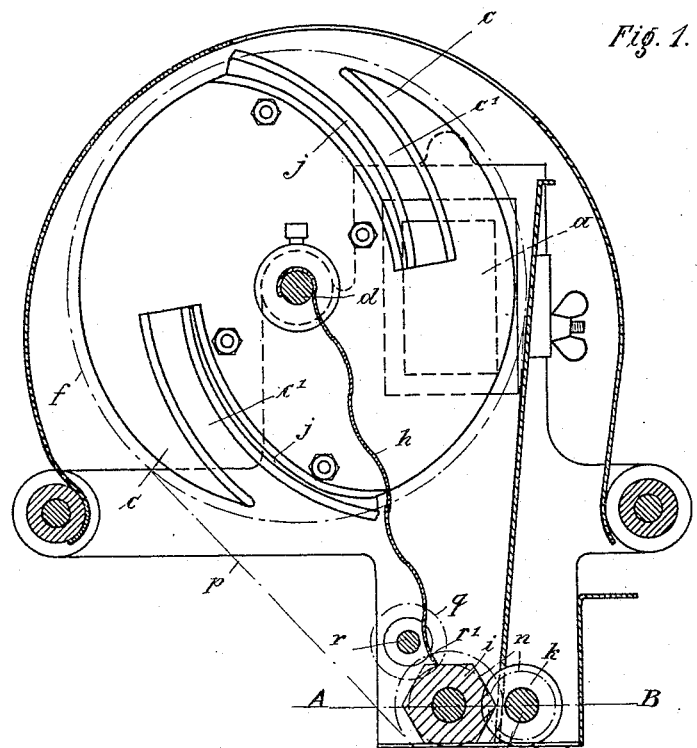
Figure 3:
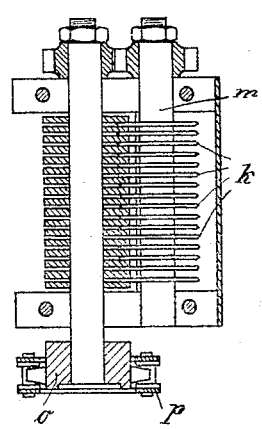
Figure 2:
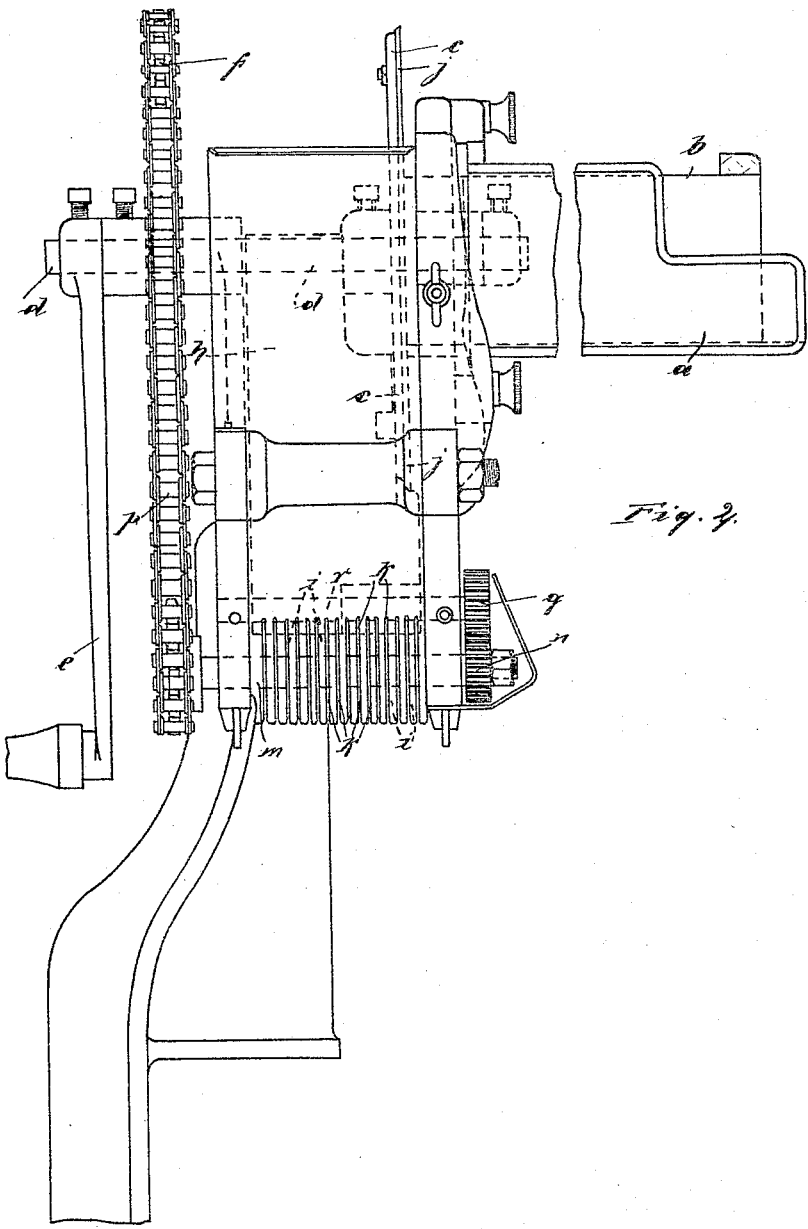

Figure 1 shows a machine according to my invention in vertical section, while Fig. 2 represents a rear view of the same. In Fig. 3 is reproduced a sectional view on the line A—B of Fig. 1.

Referring to the drawings, $a$ designates a feed channel into which the material to be cut is introduced and wherein the same is advanced by means of the slide $b$. At the rear end of the feed channel $a$ is disposed the cutter disk $c$ which is secured upon the axle $d$. For actuating the axle $d$ by hand, the latter is provided with an operating handle $e$. However, the machine may be operated from any motive power by means of a suitable driving gearing, or may be directly coupled with an electromotor. The axle $d$ carries a chain wheel $f$ for the purpose of operating the other parts of the machine. Upon the side of the disk $c$ facing the feed channel $a$ are mounted two knives or cutters $j$ in diagonal opposition. The cutting edges of these knives are distanced from the disk an amount corresponding to the desired thickness of slices to be cut. The disk $c$ is further provided with openings $c'$ extending spirally behind the knives $j$ for the purpose of receiving the meat or the like matter cut into slices, by the rotating knives. The thus produced slices of meat or the like material, owing to their weight drop upon a guide plate $h$ which is movably suspended by being hung upon the axle $d$ with one curved end. The guide plate $h$ extends toward the roller $i$ forming a part of the device for cutting the meat or the like material into strips. The guide plate $h$ bears upon the roller $i$ with its lower end. In the illustrated example, the roller $i$ consists of a plurality of disks fixedly secured upon an axle in such a manner as to leave small gaps between two adjoining disks into which gaps enter counter disks $k$ supported upon the axle $m$. The latter axle $m$ and the roller axle are operatively interconnected by means of a toothed wheel gearing $n$. The roller axle is further provided with a chain wheel $o$ which is actuated by means of a chain $p$ from the chain wheel $f$ hereinbefore described as being mounted upon the axle $d$. By means of this chain drive and the said toothed wheel gearing $n$, the roller $i$ and the counter disk $k$ are revolved in opposite directions in such a manner that their upper parts move toward each other.

The roller $i$ according to this invention is of a prismatic form, for instance, of hexagonal cross section, such as shown in the drawing, whereby a plurality of even surfaces are formed upon the circumference of the roller. The axially extending sides or edges of the thus produced circumferential surfaces are farther removed from the center of the axle than the middle portions of the said surfaces, or to express it in other words, the said edges project over the path of movement of the said middle portions. The material already cut up into slices and having dropped upon the guide plate $h$, slides on to a plurality of the surfaces of the roller $i$ and is fed thereby to the counter disks $k$ between which and the roller it is divided up into strips.

If the guide plate $h$ is resting upon the roller $i$, it is thereby directly agitated which agitation acts to prevent the sliced material from adhering or sticking to the guide plate. The guide plate $h$ may be corrugated as is shown in the illustrated example, to assist the sliced material in its advancing movement toward the additional cutting device.

Instead of being entirely even, the circumferential surfaces of the roller $i$ may be slightly curved or corrugated.

The guide plate $h$ instead of directly resting upon the roller $i$, may terminate slightly in front of the latter, and a special shaft $r$ may be provided and actuated from the toothed wheel $n$ by means of a wheel $q$ meshing therewith. Upon the thus provided shaft $r$ is preferably secured a cam $r'$ for the purpose of agitating the guide plate $h$ by acting against the back of the said guide plate at each revolution.

Having thus described my invention, what I claim and desire to secure by Letters Patent of the United States, is:

1. A cutting device for a machine of the character described comprising a rotary cutting roller having a series of spaced cutting disks, a rotary feed roller having a series of annular slots engaged by the disks of said cutting roller and peripheral projections adapted to engage the material and impel it toward said cutting roller, and a guide plate suspended above said feed roller and engaged and vibrated by said projections.

2. A cutting device for a machine of the character described comprising a rotary cutting roller having a series of spaced cutting disks, a rotary feed roller having a series of annular slots engaged by the disks of said cutting roller and peripheral projections adapted to engage the material and impel it toward said cutting roller, and a corrugated guide plate suspended above said feed roller and engaged and vibrated by said projections.

In testimony whereof I have hereunto affixed my signature in the presence of two subscribing witnesses.

GUSTAV ADOLF HOLZAPFEL.

Witnesses:
RUDOLPH FRICKE,
MARTA KRALAPP.

Copies of this patent may be obtained for five cents each, by addressing the "Commissioner of Patents, Washington, D. C."